(12) United States Patent
Ma et al.

(10) Patent No.: US 11,303,184 B2
(45) Date of Patent: Apr. 12, 2022

(54) FAN AND ELECTROMECHANICAL DEVICE

(71) Applicant: NIDEC CORPORATION, Kyoto (JP)

(72) Inventors: Qiang Ma, Kyoto (JP); Toshifumi Fukui, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 230 days.

(21) Appl. No.: 16/683,279

(22) Filed: Nov. 14, 2019

(65) Prior Publication Data

US 2020/0169145 A1    May 28, 2020

(30) Foreign Application Priority Data

Nov. 26, 2018  (CN) .......................... 201821953886.1

(51) Int. Cl.
  *H02K 5/24* (2006.01)
  *H02K 5/22* (2006.01)
  *F04D 19/00* (2006.01)
  *H02K 5/12* (2006.01)

(52) U.S. Cl.
  CPC ........... *H02K 5/225* (2013.01); *F04D 19/002* (2013.01); *H02K 5/12* (2013.01); *H02K 5/24* (2013.01)

(58) Field of Classification Search
  CPC ........ F04D 19/002; H02K 5/12; H02K 5/225; H02K 5/24

USPC ........................................................... 310/59
See application file for complete search history.

(56) References Cited

U.S. PATENT DOCUMENTS

| | | | |
|---|---|---|---|
| 7,066,720 B2* | 6/2006 | Cheng | F04D 29/526 417/361 |
| 2015/0015993 A1* | 1/2015 | Lee | G11B 19/2009 360/99.08 |

\* cited by examiner

*Primary Examiner* — Terrance L Kenerly
(74) *Attorney, Agent, or Firm* — JCIPRNET

(57) ABSTRACT

A fan and an electromechanical device are provided. The fan includes: an impeller, a motor, a motor support portion, a wire, and a wire lead-out portion. The wire lead-out portion includes: a base portion; a wire holding portion limiting movement of the wire in a first direction; and a wire locking portion, formed at an end of the wire holding portion and extending along the extension direction of the base portion, wherein the wire locking portion limits a movement of the wire in a second direction perpendicular to both the first direction and the extension direction of the base portion. The wire locking portion includes a blocking portion that does not extend beyond the wire holding portion in the extension direction of the base portion, and an extension portion extending from the blocking portion to an outer side of the wire holding portion along the extension direction of the base portion.

11 Claims, 5 Drawing Sheets

FAN AND ELECTROMECHANICAL DEVICE

CROSS-REFERENCE TO RELATED APPLICATION

This application claims the priority of China patent application serial no. 201821953886.1, filed on Nov. 26, 2018. The entirety of the above-mentioned patent application is hereby incorporated by reference herein and made a part of this specification.

BACKGROUND OF THE INVENTION

1. Field of the Invention

This application relates to the electromechanical field, and in particular, to a fan and an electromechanical device.

2. Description of Related Art

A fan is widely applied to household appliances, office automation equipment, and the like, to promote gas flow.

The fan includes an enclosure, an impeller, a motor driving the impeller, and a wire supplying power to the motor. One end of the wire is connected to a circuit board inside the motor, and the other end of the wire is led out from the enclosure, to be electrically connected to a power source outside the enclosure.

It should be noted that, the foregoing introduction of the related art is described to make a clear and complete description of technical solutions of the disclosure conveniently, and facilitate the understanding of people skilled in the art. It should not be considered that the technical solutions were acknowledged by people skilled in the art because the technical solutions are described in the description of the related art of the disclosure.

SUMMARY OF THE INVENTION

According to an aspect of embodiments of this application, a fan is provided, including:
an impeller;
a motor centering on a central axis to drive the impeller;
a motor support portion supporting the motor;
a wire supplying a current to the motor from an external power source; and
a wire lead-out portion configured in the motor support portion and leading the wire,
wherein the wire lead-out portion includes:
a base portion, extending along a lead-out direction of the wire;
a wire holding portion, extending from the base portion along a direction perpendicular to an extension direction of the base portion, where the wire holding portion limits a movement of the wire in a first direction, and the first direction is parallel to the central axis; and
a wire locking portion, configured at an end of the wire holding portion and extending along the extension direction of the base portion, wherein the wire locking portion limits a movement of the wire in a second direction, and the second direction is perpendicular to both the first direction and the extension direction of the base portion, and the wire locking portion includes a blocking portion that does not extend beyond the wire holding portion in the extension direction of the base portion, and an extension portion extending from the blocking portion to an outer side of the wire holding portion along the extension direction of the base portion.

According to another aspect of the embodiments of this application, in the first direction, a thickness of the wire locking portion is greater than or equal to a sum of a thickness of the wire holding portion and a diameter of the wire.

According to another aspect of the embodiments of this application, a first distance between the base portion and a side of the extension portion facing the base portion is greater than a second distance between the base portion and a side of the blocking portion facing the base portion.

According to another aspect of the embodiments of this application, a side of the extension portion facing the base portion includes an upper end away from the wire holding portion and a lower end close to the wire holding portion in the first direction, and a distance between the upper end and the base portion is greater than a distance between the lower end and the base portion.

According to another aspect of the embodiments of this application, the wire holding portion includes at least a first wire holding portion, a second wire holding portion and a third wire holding portion that are separated from each other and are disposed from a location close to the central axis to a location away from the central axis, and in the extension direction of the base portion, a clearance between the second wire holding portion and the third wire holding portion is less than one and a half times a diameter of the wire.

According to another aspect of the embodiments of this application, in the extension direction of the base portion, an end of the extension portion farthest from the central axis is farther from the central axis than an end of the third wire holding portion closest to the central axis.

According to another aspect of the embodiments of this application, the first wire holding portion and the second wire holding portion are polygons.

According to another aspect of the embodiments of this application, the wire lead-out portion and the motor support portion are formed integrally.

According to another aspect of the embodiments of this application, the wire lead-out portion is made of resin.

According to another aspect of the embodiments of this application, in the second direction, a distance between an end of the first wire holding portion and the base portion, a distance between an end of the second wire holding portion and the base portion, and a distance between an end of the third wire holding portion and the base portion are equal.

According to another aspect of the embodiments of this application, an electromechanical device is provided, including the fan according to any one of the aspects described above.

Referring to the following descriptions and accompanying drawings, specific implementations of the disclosure are disclosed in detail, and methods that may be applied to principles of the disclosure are demonstrated. It should be understood that, the implementations of the disclosure are not limited in scopes. The implementations of the disclosure include many variations, modifications, and the like within the scope of the spirit and the clause of the appended claims.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the invention. Apparently, the accompanying drawings in the following descriptions are some embodiments of the disclosure, and for those skilled in the art, other drawings may be achieved according to the accompanying drawings without creative works. In the accompanying drawings.

DESCRIPTION OF THE EMBODIMENTS

Figure 1:
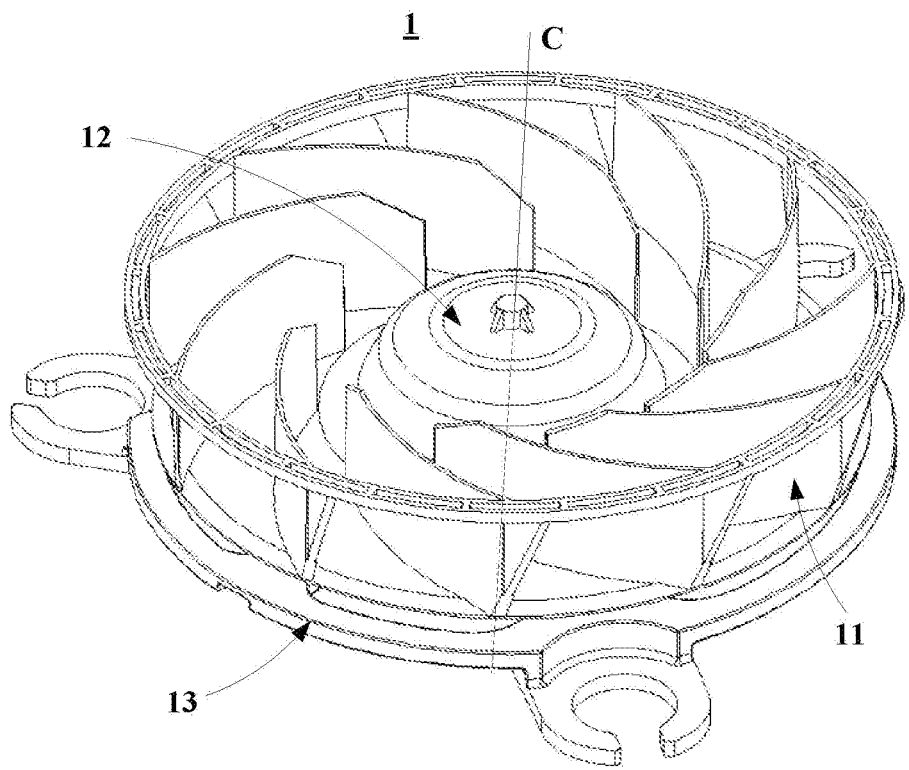
FIG. 1 is a schematic stereo diagram of a fan according to Embodiment 1 of this application.

It is found that: in an existing fan, if not firmly held outside an enclosure, a wire easily rises from an end face of the enclosure, and therefore the wire is in a loose state. In addition, in some situations, the wire may further break a limit of a wire leading portion, and is in an easily moved state. The loose wire or the wire away from the wire leading portion may be involved into an air flow path, and therefore in contact with an impeller of the fan, which affects normal running of the fan.

This application provides a fan and an electromechanical device. In the fan, a lateral movement of a wire of the fan is limited by a wire locking portion, and a movement of the wire is further limited by an extension portion of the wire locking portion. Therefore, the wire can be firmly fixed, to prevent the loosening or escape of the wire, thereby improving the reliability of the fan.

A beneficial effect of the disclosure lies in that: the lateral movement of the wire of the fan is limited by the wire locking portion, and the movement of the wire is further limited by the extension portion of the wire locking portion. Therefore, the wire can be firmly fixed, to prevent loosening or escape of the wire, thereby improving the reliability of the fan.

Referring to the drawings, the foregoing described and other features of the disclosure are more obvious through the following specification. In the specification and the accompanying drawings, specific implementations of the disclosure are disclosed in detail, demonstrating parts of the implementations thereof that may be applied to principles of the disclosure, and it should be understood that, the disclosure is not limited by the implementations described. On the contrary, the disclosure includes all modifications, variations, and the like that fall within the scope of the appended claims.

In addition, in the following descriptions of the disclosure, for ease of description, a direction of a central axis C of a motor is referred to as an "axial direction"; in the "axial direction", a direction from an impeller to a motor support portion 13 is referred to as a "down" direction, a direction opposite to the "down" direction is an "up" direction; a radius direction centering on the central axis C is referred to as a "radial direction"; and a direction around the central axis C is referred to as a "circumferential direction".

Embodiment 1

The present embodiment of this application provides a fan. FIG. 1 is a schematic stereo diagram of the fan, and FIG. 2 is a sectional view of the fan along a central axis.

Figure 2:
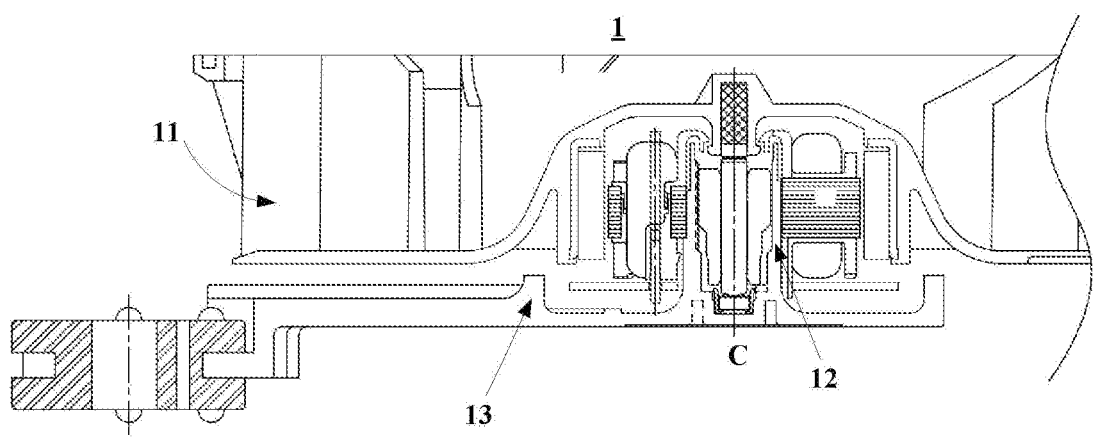
FIG. 2 is a sectional view of a fan along a central axis according to Embodiment 1 of this application.

As shown in FIG. 1, a fan 1 includes: an impeller 11; a motor 12; a motor support portion 13; a wire (which is not shown in FIG. 1 and FIG. 2); and a wire lead-out portion (which is not shown in FIG. 1 and FIG. 2).

In the present embodiment, the motor 12 centers on a central axis C to drive the impeller 11; the motor support portion 13 is configured to support the motor 12; the wire supplies a current to the motor 12 from an external power source; and the wire lead-out portion leads the wire.

Figure 3:
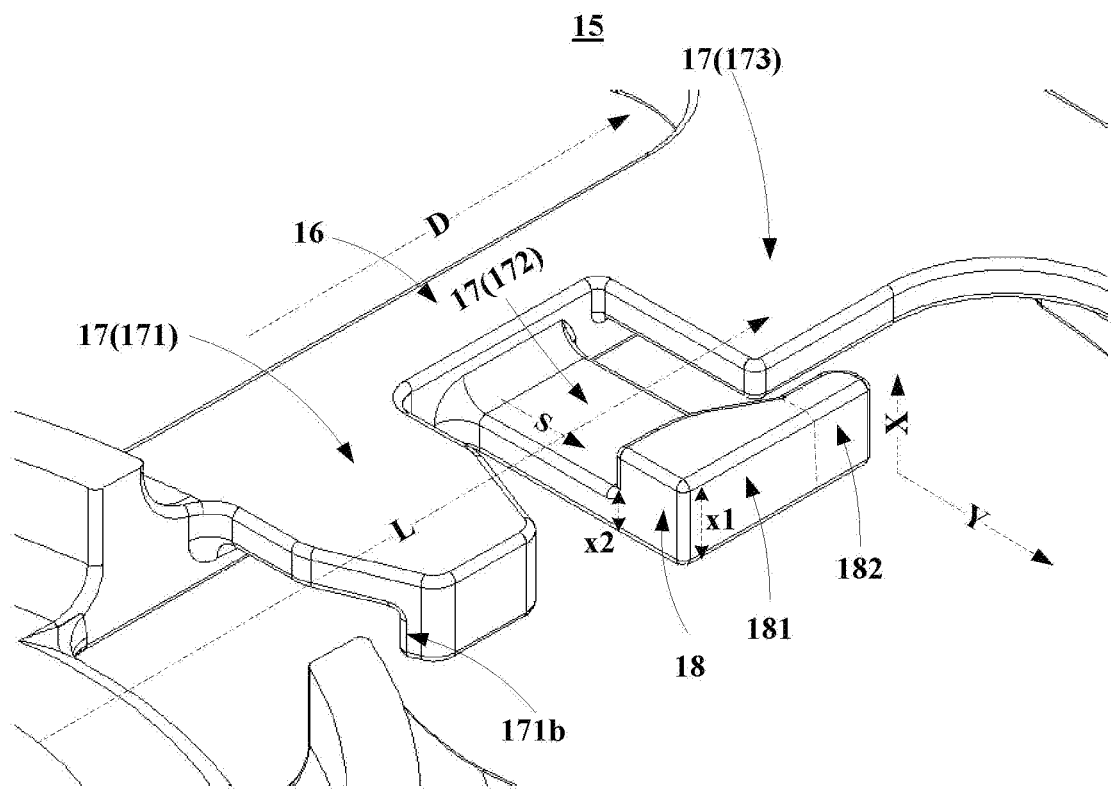
FIG. 3 is a schematic stereo diagram of a wire lead-out portion according to Embodiment 1 of this application.

FIG. 3 is a schematic stereo diagram of a wire lead-out portion 15. As shown in FIG. 3, the wire lead-out portion 15 may be formed at the motor support portion 13.

As shown in FIG. 3, the wire lead-out portion 15 includes: a base portion 16; a wire holding portion 17; and a wire locking portion 18.

In the present embodiment, the base portion 16 extends along a lead-out direction L of the wire. The wire holding portion 17 extends from the base portion 16 along a direction S perpendicular to an extension direction D of the base portion 16, and limits a movement of the wire in a first direction X, where the first direction X is parallel to the central axis C, and the direction D is parallel to the direction L. The wire locking portion 18 is formed at an end of the wire holding portion 17 away from the base portion 16, extends along the extension direction L of the base portion 16, and may limit a movement of the wire in a second direction Y, where the second direction Y is perpendicular to both the first direction X and the extension direction D of the base portion 16, and the second direction Y is parallel to the direction S.

In the present embodiment, the wire locking portion 18 includes a blocking portion 181 and an extension portion 182. The blocking portion 181 does not extend beyond the wire holding portion 17 in the extension direction D of the base portion 16, and the extension portion 182 extends from the blocking portion 181 to an outer side of the wire holding portion 17 along the extension direction D of the base portion 16.

Figure 4:
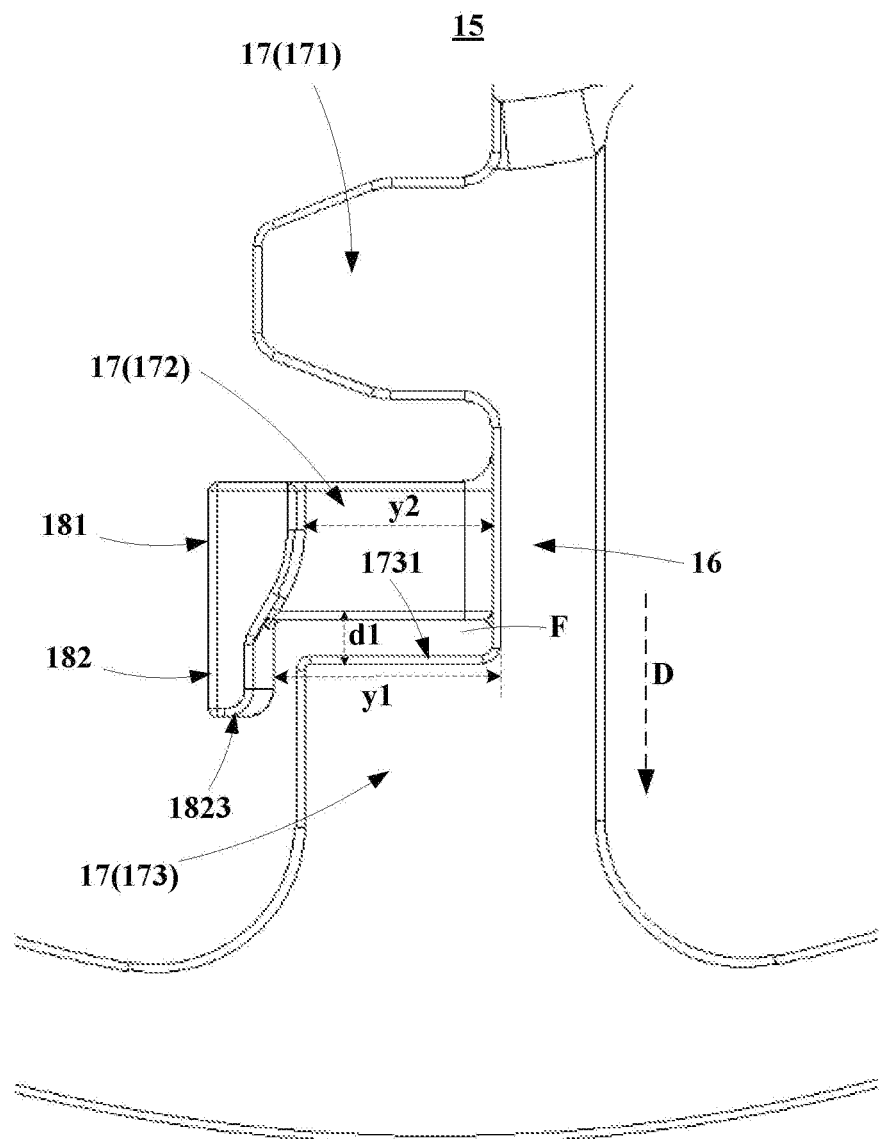
FIG. 4 is a top view of a wire lead-out portion according to Embodiment 1 of this application.

FIG. 4 is a top view of the wire lead-out portion 15. As shown in FIG. 4, the extension portion 182 of the wire locking portion 18 may block a gap F between different portions (for example, a second wire holding portion 172 and a third wire holding portion 173 described below) of the wire holding portion 17 in the extension direction, to limit a movement range of the wire in a range of the gap F (that is, sticking the wire), thereby preventing the wire from escaping from the wire lead-out portion 15 through the gap F. In this way, the wire does not affect normal running of the fan.

In the present embodiment, as shown in FIG. 3, in the first direction X, a thickness x1 of the wire locking portion 18 is greater than a thickness x2 of the wire holding portion 17. Therefore, a step may be formed between the wire locking portion 18 and the wire holding portion 17, so as to limit the movement of the wire in the second direction Y. In an implementation, the thickness of the wire locking portion 18 is greater than or equal to a sum of the thickness of the wire holding portion 17 and a diameter of the wire. For example, the thickness of the wire locking portion 18 may be more than two times the thickness of the wire holding portion 17.

In the present embodiment, as shown in FIG. 4, a first distance y1 between a side of the extension portion 182 facing the base portion 16 and the base portion 16 is greater than a second distance y2 between a side of the blocking portion 181 facing the base portion 16 and the base portion 16. Therefore, in the second direction Y, a width difference may be formed between the blocking portion 181 and the extension portion 182, to prevent the extension portion 182 from interfering with other neighboring portions of the wire holding portion 17.

Figure 5:
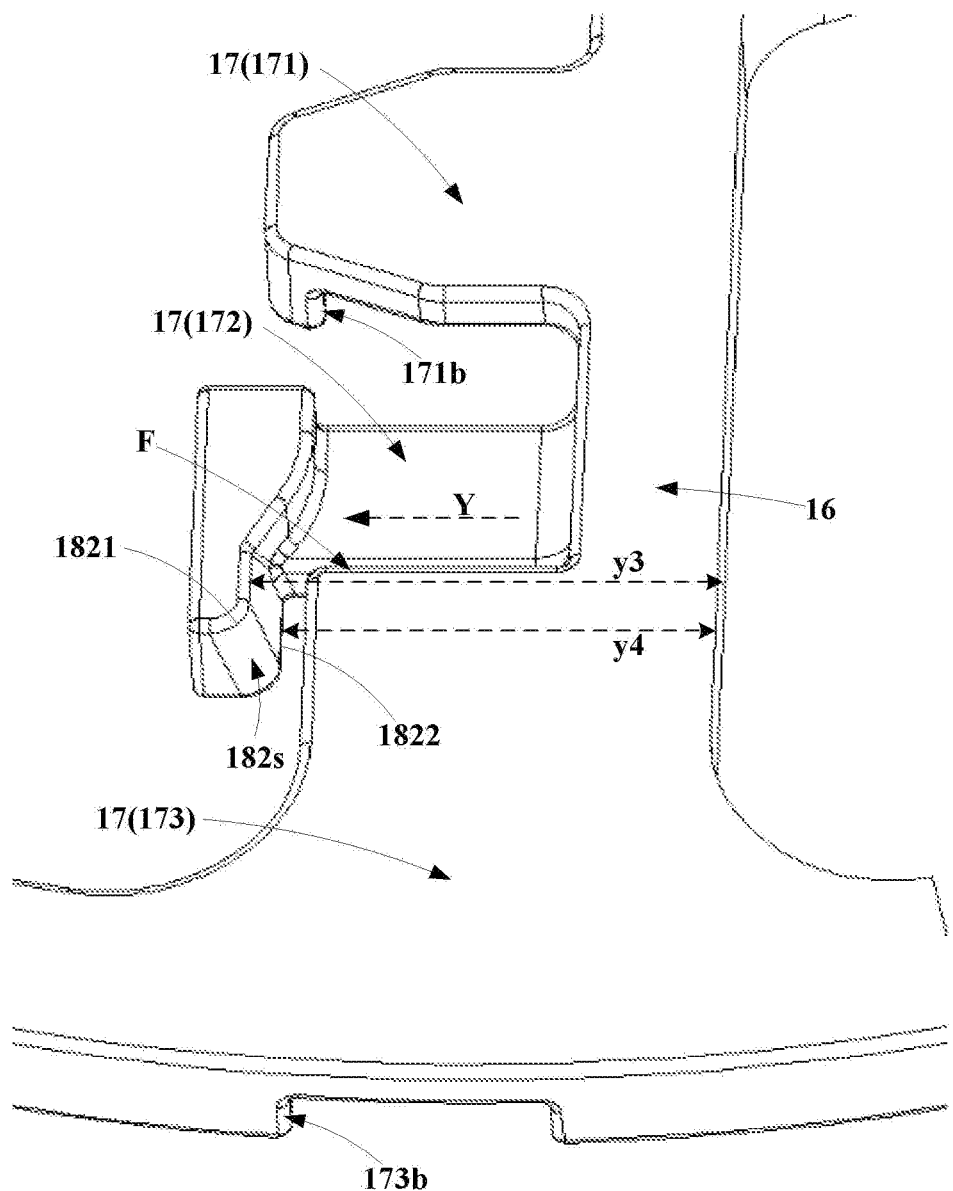
FIG. 5 is another schematic stereo diagram of a wire lead-out portion according to Embodiment 1 of this application.

FIG. 5 is another schematic stereo diagram of the wire lead-out portion 15. As shown in FIG. 5, a side 182s of the extension portion 182 facing the base portion 16 includes an upper end 1821 away from the wire holding portion 17 and a lower end 1822 close to the wire holding portion 17 in the first direction X. A distance y3 between the upper end 1821 and the base portion 16 is greater than a distance y4 between the lower end 1822 and the base portion 16. Therefore, the wire can enter the gap F along a direction from the upper end 1821 to the lower end 1822 more easily, and the wire does not loosen or fall off from the gap F easily. For example, a surface shape of the side 182s of the extension portion 182 facing the base portion 16 may be a bevel, a curved surface, or a shape combined with a bevel and a curved surface.

As shown in FIG. 3, FIG. 4, and FIG. 5, the wire holding portion 17 may include at least a first wire holding portion 171, a second wire holding portion 172 and a third wire holding portion 173 that are separated from each other and are disposed in a direction from a location close to the central axis to a location away from the central axis. As shown in FIG. 3, the first wire holding portion 171 and the third wire holding portion 173 may be located at one side (for example, an upper side or a lower side) of the wire in the first direction X, and the second wire holding portion 172 may be located at the other side (for example, the lower side or the upper side) of the wire in the first direction X. Therefore, the first wire holding portion 171, the second wire holding portion 172 and the third wire holding portion 173 may clamp the wire in both sides of the first direction X, so as to limit the movement of the wire in the first direction X.

In the present embodiment, the wire locking portion 18 may be disposed at the second wire holding portion 172, and the extension portion 182 extends to the third wire holding portion 173. In addition, the present embodiment may not be limited thereto. For example, the extension portion 182 may further extend to the first wire holding portion 171; or the wire locking portion 18 may be disposed at the first wire holding portion 171, and the extension portion 182 extends to the second wire holding portion 172, and the like.

As shown in FIG. 4, in the extension direction D of the base portion 16, a clearance dl between the second wire holding portion 172 and the third wire holding portion 173 is less than one and a half times the diameter of the wire. Therefore, the movement range of the wire in the gap F is limited, so as to prevent loosening or escape of the wire from the wire locking portion 18.

In the present embodiment, as shown in FIG. 4, in the extension direction D of the base portion 16, an end 1823 of the extension portion 182 farthest from the central axis C is farther from the central axis C than an end 1731 of the third wire holding portion 173 closest to the central axis C. Therefore, an opening of the gap F facing the second direction Y is completely blocked by the extension portion 182, thereby further preventing the wire from escaping from the gap F.

In the present embodiment, as shown in FIG. 4, the first wire holding portion and the second wire holding portion may be polygons. Therefore, spaces occupied by the first wire holding portion 171 and the second wire holding portion 172 can be reduced.

Figure 6:
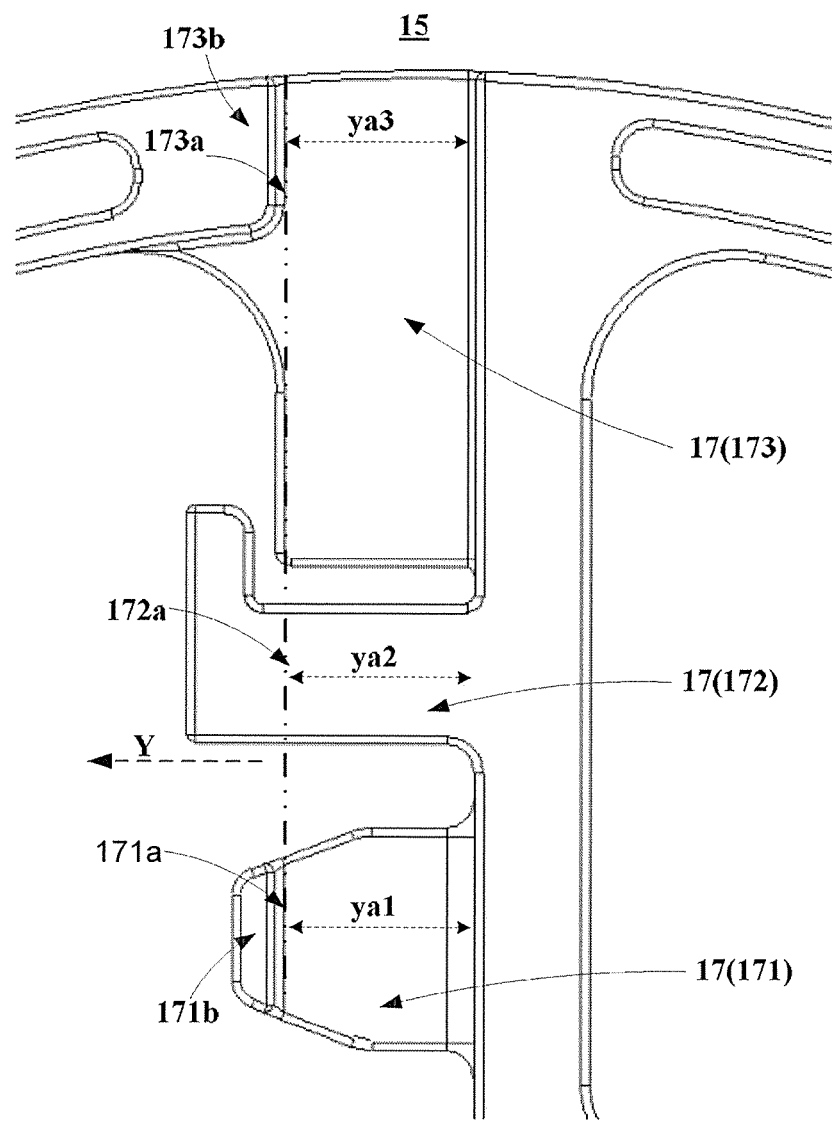
FIG. 6 is a schematic bottom view of a wire lead-out portion according to Embodiment 1 of this application.

FIG. 6 is a schematic bottom view of the wire lead-out portion 15. As shown in FIG. 6, in the second direction Y, a distance ya1 between an end 171a of the first wire holding portion 171 and the base portion 16, a distance ya2 between an end 172a of the second wire holding portion 172 and the base portion 16, and a distance ya3 between an end 173a of the third wire holding portion 173 and the base portion 16 are equal. Therefore, spaces of the wire holding portions are reduced.

In addition, as shown in FIG. 3, FIG. 5 and FIG. 6, in the second direction Y, the ends of the first wire holding portion 171 and the third wire holding portion 173 may further be provided with protrusion portions 171b and 173b (which are not shown in FIG. 3) extending to the lower side, and the protrusion portions 171b and 173b may be configured to limit the movement of the wire in the second direction Y.

In the present embodiment, the wire lead-out portion 15 and the motor support portion 13 may be formed integrally. Therefore, a production process can be simplified.

In the present embodiment, the wire lead-out portion 15 is made of resin. Therefore, costs can be reduced.

According to the present embodiment, in the fan, a lateral (that is, the second direction) movement of the wire of the fan is limited by the wire locking portion, and the movement of the wire is further limited by the extension portion of the wire locking portion. Therefore, the wire can be firmly fixed, to prevent loosening or escape of the wire, thereby improving the reliability of the fan.

Embodiment 2

Embodiment 2 of the disclosure provides an electromechanical device, including the fan described in Embodiment 1. Because the structure of the fan has been described in detail in Embodiment 1, the content is combined, and the descriptions thereof are omitted herein.

According to the present embodiment, in the fan, a lateral (that is, the second direction) movement of the wire of the fan is limited by the wire locking portion, and the movement of the wire is further limited by the extension portion of the wire locking portion. Therefore, the wire is firmly fixed, to prevent loosening or escape of the wire, thereby improving the reliability of the fan and further improving the reliability of the electromechanical device.

The disclosure is described above with reference to specific embodiments, but people skilled in the art should understand that, the descriptions are exemplary, and are not intended to limit the protection scope of the disclosure. People skilled in the art may make various modifications and variations on the disclosure according to the spirit and the principle of the disclosure, and the modifications and variations fall within the scope of the disclosure.

What is claimed is:

1. A fan, comprising:
    an impeller;
    a motor centering on a central axis to drive the impeller;
    a motor support portion supporting the motor;
    a wire supplying a current to the motor from an external power source; and
    a wire lead-out portion configured in the motor support portion and leading the wire,
    wherein the wire lead-out portion comprises:
    a base portion, extending along a lead-out direction of the wire;
    a wire holding portion, extending from the base portion along a direction perpendicular to an extension direction of the base portion, wherein the wire holding portion limits a movement of the wire in a first direction, and the first direction is parallel to the central axis; and a wire locking portion, configured at an end of the wire holding portion and extending along the extension direction of the base portion, wherein the wire locking portion limits a movement of the wire in a second direction, and the second direction is perpendicular to both the first direction and the extension direction of the base portion, and the wire locking portion comprises a blocking portion that does not extend beyond the wire holding portion in the extension direction of the base portion, and an extension portion extending from the blocking portion to an outer side of the wire holding portion along the extension direction of the base portion, wherein the wire holding portion comprises at least a first wire holding portion, a second wire holding portion and a third wire holding portion that are separated from each other and are disposed from a location close to the central axis to a location away from the central axis, and an end of the third wire holding portion is provided with a protrusion, configured merely at a portion near an outer peripheral of the wire lead-out portion.

2. The fan according to claim 1, wherein
in the first direction, a thickness of the wire locking portion is greater than or equal to a sum of a thickness of the wire holding portion and a diameter of the wire.

3. The fan according to claim 1, wherein
a first distance between the base portion and a side of the extension portion facing the base portion is greater than a second distance between the base portion and a side of the blocking portion facing the base portion.

4. The fan according to claim 1, wherein
a side of the extension portion facing the base portion comprises an upper end away from the wire holding portion and a lower end close to the wire holding portion in the first direction, and a distance between the upper end and the base portion is greater than a distance between the lower end and the base portion.

5. The fan according to claim 1, wherein
in the extension direction of the base portion, a clearance between the second wire holding portion and the third wire holding portion is less than one and a half times a diameter of the wire.

6. The fan according to claim 5, wherein
in the extension direction of the base portion,
an end of the extension portion farthest from the central axis is farther from the central axis than an end of the third wire holding portion closest to the central axis.

7. The fan according to claim 5, wherein
the first wire holding portion and the second wire holding portion are polygons.

8. The fan according to claim 1, wherein
the wire lead-out portion and the motor support portion are formed integrally.

9. The fan according to claim 1, wherein
the wire lead-out portion is made of resin.

10. The fan according to claim 5, wherein
in the second direction, a distance between an end of the first wire holding portion and the base portion, a distance between an end of the second wire holding portion and the base portion, and a distance between an end of the third wire holding portion and the base portion are equal.

11. An electromechanical device, comprising the fan according to claim 1.

* * * * *